US009005034B2

(12) United States Patent
McAllister et al.

(10) Patent No.: US 9,005,034 B2
(45) Date of Patent: Apr. 14, 2015

(54) SYSTEMS AND METHODS FOR OUT-OF-BAND GAMING MACHINE MANAGEMENT

(75) Inventors: Lawrence McAllister, Las Vegas, NV (US); Anand Singh, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1344 days.

(21) Appl. No.: 12/113,005

(22) Filed: Apr. 30, 2008

(65) Prior Publication Data
US 2009/0275395 A1 Nov. 5, 2009

(51) Int. Cl.
*A63F 13/10* (2006.01)
*A63F 13/40* (2014.01)

(52) U.S. Cl.
CPC .......... *A63F 13/10* (2013.01); *A63F 2300/5553* (2013.01); *A63F 2300/8082* (2013.01)

(58) Field of Classification Search
USPC .......................................... 463/16, 29, 42, 20
See application file for complete search history.

(56) References Cited

U.S. PATENT DOCUMENTS

| | | | |
|---|---|---|---|
| 3,766,452 A | 10/1973 | Burpee et al. | 317/262 R |
| 4,339,798 A | 7/1982 | Hedges et al. | 364/412 |
| 4,373,726 A | 2/1983 | Churchill et al. | 273/138 A |
| 4,531,187 A | 7/1985 | Uhland | 364/412 |
| 4,586,712 A | 5/1986 | Lorber et al. | 273/149 R |
| 4,659,082 A | 4/1987 | Greenberg | 273/149 R |
| 4,693,480 A | 9/1987 | Smith | 273/296 |
| 4,725,079 A | 2/1988 | Koza et al. | 283/73 |
| 4,814,589 A | 3/1989 | Storch et al. | 235/375 |
| 4,832,341 A | 5/1989 | Muller et al. | 273/139 |
| 4,995,615 A | 2/1991 | Cheng | 273/292 |
| 5,007,649 A | 4/1991 | Richardson | |
| 5,083,800 A | 1/1992 | Lockton | 273/439 |
| 5,179,517 A | 1/1993 | Sarbin et al. | 364/410 |
| 5,275,400 A | 1/1994 | Weingardt et al. | 273/85 CP |
| 5,283,422 A | 2/1994 | Storch et al. | 235/375 |
| 5,321,241 A | 6/1994 | Craine | 235/380 |
| 5,324,035 A | 6/1994 | Morris et al. | 273/138 A |
| 5,326,104 A | 7/1994 | Pease et al. | 273/138 A |
| 5,398,932 A | 3/1995 | Eberhardt et al. | 273/138 A |

(Continued)

FOREIGN PATENT DOCUMENTS

DE 199 40 954 A1 3/2001
EP 1 074 955 A2 2/2001

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Tramar Harper
(74) *Attorney, Agent, or Firm* — Frank Abramonte; Marvin A. Hein; Philip J. Anderson (57) ABSTRACT

Gaming machines may be remotely accessed by a gaming machine management server. The gaming machine management server may access a respective gaming machine while the respective gaming machine is powered off. The gaming machine management server may access a respective gaming machine while the respective gaming machine is powered on and concurrently while an operating system of the respective gaming machine is being executed.

16 Claims, 5 Drawing Sheets

(56) References Cited

U.S. PATENT DOCUMENTS

| | | | | |
|---|---|---|---|---|
| 5,472,194 A | 12/1995 | Breeding et al. | ......... | 273/138 A |
| 5,505,449 A | 4/1996 | Eberhardt et al. | ........ | 273/138 A |
| 5,562,284 A | 10/1996 | Stevens | ......... | 273/139 |
| 5,605,334 A | 2/1997 | McCrea, Jr. | ......... | 273/309 |
| 5,605,506 A | 2/1997 | Hoorn et al. | ......... | 463/47 |
| 5,613,912 A | 3/1997 | Slater | ......... | 463/25 |
| 5,643,086 A | 7/1997 | Alcorn et al. | ......... | 463/29 |
| 5,651,548 A | 7/1997 | French et al. | ......... | 273/309 |
| 5,655,961 A | 8/1997 | Acres et al. | ......... | 463/27 |
| 5,707,287 A | 1/1998 | McCrea, Jr. | ......... | 463/27 |
| 5,741,183 A | 4/1998 | Acres et al. | ......... | 463/42 |
| 5,745,110 A | 4/1998 | Ertemalp | ......... | 345/340 |
| 5,759,102 A | 6/1998 | Pease et al. | ......... | 463/42 |
| 5,766,074 A | 6/1998 | Cannon et al. | | |
| 5,769,458 A | 6/1998 | Carides et al. | ......... | 283/102 |
| 5,770,533 A | 6/1998 | Franchi | ......... | 463/42 |
| 5,779,545 A | 7/1998 | Berg et al. | ......... | 463/22 |
| 5,800,268 A | 9/1998 | Molnick | | |
| 5,803,808 A | 9/1998 | Strisower | ......... | 463/11 |
| 5,813,912 A | 9/1998 | Shultz | ......... | 463/25 |
| 5,823,879 A | 10/1998 | Goldberg et al. | ......... | 463/42 |
| 5,830,064 A | 11/1998 | Bradish et al. | ......... | 463/22 |
| 5,830,067 A | 11/1998 | Graves et al. | ......... | 463/40 |
| 5,830,068 A | 11/1998 | Brenner et al. | ......... | 463/42 |
| 5,831,669 A | 11/1998 | Adrain | ......... | 348/143 |
| 5,851,149 A | 12/1998 | Xidos et al. | ......... | 463/42 |
| 5,855,515 A | 1/1999 | Pease et al. | ......... | 463/27 |
| 5,890,963 A | 4/1999 | Yen | ......... | 463/42 |
| 5,895,048 A | 4/1999 | Smith, Jr. | ......... | 273/293 |
| 5,895,451 A | 4/1999 | Yamade et al. | | |
| 5,905,847 A | 5/1999 | Kobayashi et al. | | |
| 5,911,626 A | 6/1999 | McCrea, Jr. | ......... | 463/27 |
| 5,941,769 A | 8/1999 | Order | ......... | 463/12 |
| 5,957,776 A | 9/1999 | Hoehne | ......... | 463/25 |
| 5,971,851 A | 10/1999 | Pascal et al. | ......... | 463/24 |
| 5,974,135 A | 10/1999 | Breneman et al. | | |
| 5,999,808 A | 12/1999 | LaDue | ......... | 455/412 |
| 6,001,016 A | 12/1999 | Walker et al. | ......... | 463/42 |
| 6,021,949 A | 2/2000 | Boiron | ......... | 235/492 |
| 6,039,650 A | 3/2000 | Hill | ......... | 463/47 |
| 6,047,322 A | 4/2000 | Vaid et al. | | |
| 6,068,553 A | 5/2000 | Parker | ......... | 463/27 |
| 6,077,161 A | 6/2000 | Wisler | ......... | 463/11 |
| 6,080,063 A | 6/2000 | Khosla | ......... | 463/42 |
| 6,089,980 A | 7/2000 | Gauselmann | ......... | 463/27 |
| 6,093,103 A | 7/2000 | McCrea, Jr. | ......... | 463/27 |
| 6,102,799 A | 8/2000 | Stupak | ......... | 463/27 |
| 6,110,041 A | 8/2000 | Walker et al. | ......... | 463/20 |
| 6,110,043 A | 8/2000 | Olsen | ......... | 463/27 |
| 6,117,012 A | 9/2000 | McCrea, Jr. | ......... | 463/27 |
| 6,135,887 A | 10/2000 | Pease et al. | ......... | 463/42 |
| 6,142,876 A | 11/2000 | Cumbers | ......... | 463/25 |
| 6,146,273 A | 11/2000 | Olsen | ......... | 463/27 |
| 6,149,522 A | 11/2000 | Alcorn et al. | ......... | 463/29 |
| 6,152,824 A | 11/2000 | Rothschild et al. | ......... | 463/42 |
| 6,154,131 A | 11/2000 | Jones, II et al. | ......... | 340/540 |
| 6,168,513 B1 | 1/2001 | Souza et al. | ......... | 453/57 |
| 6,168,523 B1 | 1/2001 | Piechowiak et al. | ......... | 463/26 |
| 6,183,366 B1 | 2/2001 | Goldberg et al. | ......... | 463/42 |
| 6,185,184 B1 | 2/2001 | Mattaway et al. | | |
| 6,186,892 B1 | 2/2001 | Frank et al. | ......... | 463/19 |
| 6,210,277 B1 | 4/2001 | Stefan | ......... | 463/27 |
| 6,213,877 B1 | 4/2001 | Walker et al. | ......... | 463/26 |
| 6,217,447 B1 | 4/2001 | Lofink et al. | ......... | 463/12 |
| 6,219,836 B1 | 4/2001 | Wells et al. | ......... | 717/11 |
| 6,244,958 B1 | 6/2001 | Acres | ......... | 463/26 |
| 6,251,014 B1 | 6/2001 | Stockdale et al. | ......... | 463/16 |
| 6,254,483 B1 | 7/2001 | Acres | | |
| 6,254,484 B1 | 7/2001 | McCrea, Jr. | ......... | 463/27 |
| 6,256,651 B1 | 7/2001 | Tuli | | |
| 6,264,561 B1 | 7/2001 | Saffari et al. | ......... | 463/42 |
| 6,267,669 B1 | 7/2001 | Luciano, Jr. et al. | ......... | 463/7 |
| 6,267,671 B1 | 7/2001 | Hogan | ......... | 463/25 |
| 6,287,202 B1 | 9/2001 | Pascal et al. | ......... | 463/42 |
| 6,299,536 B1 | 10/2001 | Hill | ......... | 463/47 |
| 6,302,790 B1 | 10/2001 | Brossard | ......... | 463/20 |
| 6,302,793 B1 | 10/2001 | Fertitta, III et al. | ......... | 463/25 |
| 6,312,332 B1 | 11/2001 | Walker et al. | ......... | 463/23 |
| 6,346,044 B1 | 2/2002 | McCrea, Jr. | ......... | 463/27 |
| 6,350,199 B1 | 2/2002 | Williams et al. | ......... | 463/16 |
| 6,362,836 B1 | 3/2002 | Shaw et al. | | |
| 6,380,953 B1 | 4/2002 | Mizuno | | |
| 6,383,076 B1 | 5/2002 | Tiedeken | ......... | 463/40 |
| 6,389,126 B1 | 5/2002 | Bjornberg et al. | | |
| 6,394,900 B1 | 5/2002 | McGlone et al. | ......... | 463/20 |
| 6,400,272 B1 | 6/2002 | Holtzman et al. | ......... | 340/572.1 |
| 6,401,099 B1 | 6/2002 | Koppolu et al. | | |
| 6,409,602 B1 | 6/2002 | Wiltshire et al. | ......... | 463/42 |
| 6,422,670 B1 | 7/2002 | Hedrick et al. | ......... | 312/223.1 |
| 6,443,839 B2 | 9/2002 | Stockdale et al. | ......... | 463/16 |
| 6,446,864 B1 | 9/2002 | Kim et al. | ......... | 235/382 |
| 6,459,882 B1 | 10/2002 | Palermo et al. | | |
| 6,460,848 B1 | 10/2002 | Soltys et al. | ......... | 273/149 R |
| 6,464,584 B2 | 10/2002 | Oliver | ......... | 463/25 |
| 6,490,285 B2 | 12/2002 | Lee et al. | | |
| 6,503,147 B1 | 1/2003 | Stockdale et al. | ......... | 463/29 |
| 6,505,772 B1 | 1/2003 | Mollett et al. | ......... | 235/379 |
| 6,508,710 B1 | 1/2003 | Paravia et al. | ......... | 463/42 |
| 6,514,140 B1 | 2/2003 | Storch | ......... | 463/25 |
| 6,516,350 B1 | 2/2003 | Lumelsky et al. | | |
| 6,517,435 B2 | 2/2003 | Soltys et al. | ......... | 463/25 |
| 6,517,436 B2 | 2/2003 | Soltys et al. | ......... | 463/29 |
| 6,520,857 B2 | 2/2003 | Soltys et al. | ......... | 463/29 |
| 6,527,271 B2 | 3/2003 | Soltys et al. | ......... | 273/148 R |
| 6,527,638 B1 | 3/2003 | Walker et al. | | |
| 6,530,836 B2 | 3/2003 | Soltys et al. | ......... | 463/29 |
| 6,530,837 B2 | 3/2003 | Soltys et al. | ......... | 463/29 |
| 6,533,276 B2 | 3/2003 | Soltys et al. | ......... | 273/148 R |
| 6,533,662 B2 | 3/2003 | Soltys et al. | ......... | 463/25 |
| 6,579,180 B2 | 6/2003 | Soltys et al. | ......... | 463/25 |
| 6,579,181 B2 | 6/2003 | Soltys et al. | ......... | 463/25 |
| 6,595,857 B2 | 7/2003 | Soltys et al. | ......... | 463/29 |
| 6,607,441 B1 | 8/2003 | Acres | ......... | 463/25 |
| 6,609,978 B1 | 8/2003 | Paulsen | ......... | 463/42 |
| 6,629,184 B1 | 9/2003 | Berg et al. | ......... | 710/306 |
| 6,629,591 B1 | 10/2003 | Griswold et al. | ......... | 194/205 |
| 6,638,161 B2 | 10/2003 | Soltys et al. | ......... | 463/12 |
| 6,638,170 B1 | 10/2003 | Crumby | ......... | 463/42 |
| 6,645,077 B2 | 11/2003 | Rowe | ......... | 463/42 |
| 6,652,378 B2 | 11/2003 | Cannon et al. | ......... | 463/20 |
| 6,656,048 B2 | 12/2003 | Olsen | ......... | 463/25 |
| 6,675,152 B1 | 1/2004 | Prasad et al. | ......... | 705/64 |
| 6,676,522 B2 | 1/2004 | Rowe et al. | ......... | 463/42 |
| 6,682,421 B1 | 1/2004 | Rowe et al. | ......... | 463/25 |
| 6,682,423 B2 | 1/2004 | Brosnan et al. | ......... | 463/29 |
| 6,685,567 B2 | 2/2004 | Cockerille et al. | ......... | 463/43 |
| 6,688,979 B2 | 2/2004 | Soltys et al. | ......... | 463/25 |
| 6,699,128 B1 | 3/2004 | Beadell et al. | ......... | 463/46 |
| 6,712,695 B2 | 3/2004 | Mothwurf et al. | ......... | 463/25 |
| 6,712,696 B2 | 3/2004 | Soltys et al. | ......... | 463/25 |
| 6,718,361 B1 | 4/2004 | Basani et al. | ......... | 709/201 |
| 6,722,985 B2 | 4/2004 | Criss-Puszkiewicz et al. | | |
| 6,729,961 B1 | 5/2004 | Millerschone | ......... | 463/30 |
| 6,736,250 B2 | 5/2004 | Mattice | ......... | 194/203 |
| 6,743,102 B1 | 6/2004 | Fiechter et al. | ......... | 463/42 |
| 6,745,330 B1 | 6/2004 | Maillot | ......... | 713/200 |
| 6,746,330 B2 | 6/2004 | Cannon | ......... | 463/25 |
| 6,755,741 B1 | 6/2004 | Rafaeli | ......... | 463/25 |
| 6,758,751 B2 | 7/2004 | Soltys et al. | ......... | 463/29 |
| 6,800,029 B2 | 10/2004 | Rowe et al. | ......... | 463/25 |
| 6,811,488 B2 | 11/2004 | Paravia et al. | ......... | 463/42 |
| 6,817,948 B2 | 11/2004 | Pascal et al. | ......... | 463/42 |
| 6,823,419 B2 | 11/2004 | Berg et al. | ......... | 710/306 |
| 6,837,789 B2 | 1/2005 | Garahi et al. | ......... | 463/29 |
| 6,848,994 B1 | 2/2005 | Knust et al. | ......... | 463/25 |
| 6,866,581 B2 | 3/2005 | Martinek et al. | ......... | 463/16 |
| 6,884,170 B2 | 4/2005 | Rowe | | |
| 6,884,173 B2 | 4/2005 | Gauselmann | ......... | 463/42 |
| 6,884,174 B2 | 4/2005 | Lundy et al. | ......... | 463/42 |
| 6,886,581 B2 * | 5/2005 | Harniet | ......... | 137/66 |
| 6,896,618 B2 | 5/2005 | Benoy et al. | ......... | 463/25 |
| 6,899,627 B2 | 5/2005 | Lam et al. | ......... | 463/40 |
| 6,902,481 B2 | 6/2005 | Breckner et al. | ......... | 463/30 |
| 6,908,387 B2 | 6/2005 | Hedrick et al. | ......... | 463/31 |

(56) References Cited

U.S. PATENT DOCUMENTS

| | | | |
|---|---|---|---|
| 6,925,701 B2 | 8/2005 | Eckstein et al. .............. 29/602.1 |
| 6,971,956 B2 | 12/2005 | Rowe et al. ..................... 463/25 |
| 6,993,587 B1 | 1/2006 | Basani et al. .................. 709/229 |
| 6,997,803 B2 | 2/2006 | LeMay et al. ................... 463/20 |
| 7,013,469 B2 | 3/2006 | Smith et al. |
| 7,025,674 B2 | 4/2006 | Adams et al. ..................... 463/1 |
| 7,027,996 B2 | 4/2006 | Levinson |
| 7,050,056 B2 | 5/2006 | Meyringer ..................... 345/440 |
| 7,062,470 B2 | 6/2006 | Prasad et al. ................... 705/64 |
| 7,086,947 B2 | 8/2006 | Walker et al. ................... 463/25 |
| 7,099,035 B2 | 8/2006 | Brooks et al. ................. 358/1.15 |
| 7,100,184 B1 | 8/2006 | Kahn |
| 7,112,138 B2 | 9/2006 | Hedrick et al. .................. 463/29 |
| 7,120,879 B2 | 10/2006 | Gutberlet et al. |
| 7,168,089 B2 | 1/2007 | Nguyen et al. ..................... 726/4 |
| 7,186,181 B2 | 3/2007 | Rowe .............................. 463/42 |
| RE39,644 E | 5/2007 | Alcorn et al. .................. 380/251 |
| 7,234,698 B2 | 6/2007 | Grauzer et al. ............ 273/149 R |
| 7,260,834 B1 | 8/2007 | Carlson |
| 7,278,923 B2 | 10/2007 | Grauzer et al. ................. 463/47 |
| 7,291,068 B2 | 11/2007 | Bryant et al. .................... 463/25 |
| 7,297,062 B2 | 11/2007 | Gatto et al. |
| 7,300,352 B2 | 11/2007 | Rowe |
| 7,303,475 B2 | 12/2007 | Britt et al. ....................... 463/42 |
| 7,309,065 B2 | 12/2007 | Yoseloff et al. ................ 273/292 |
| 7,311,605 B2 | 12/2007 | Moser .............................. 463/25 |
| 7,329,185 B2 | 2/2008 | Conover et al. .................. 463/25 |
| 7,330,822 B1 | 2/2008 | Robson et al. ...................... 705/9 |
| 7,331,520 B2 | 2/2008 | Silva et al. ..................... 235/381 |
| 7,337,330 B2 | 2/2008 | Gatto et al. |
| 7,346,682 B2 | 3/2008 | Basani et al. .................. 709/224 |
| 7,349,920 B1 | 3/2008 | Feinberg et al. ............... 707/102 |
| 7,351,147 B2 | 4/2008 | Stockdale et al. ............... 463/29 |
| 7,353,183 B1 | 4/2008 | Musso |
| 7,356,770 B1 | 4/2008 | Jackson ........................ 715/736 |
| 7,363,342 B1 | 4/2008 | Wang et al. .................... 709/204 |
| 7,364,510 B2 | 4/2008 | Walker et al. ................... 463/42 |
| 7,370,282 B2 | 5/2008 | Cary .............................. 715/772 |
| 7,384,339 B2 | 6/2008 | LeMay et al. ................... 463/30 |
| 7,390,256 B2 | 6/2008 | Soltys et al. ..................... 463/12 |
| 7,398,327 B2 | 7/2008 | Lee ................................ 709/250 |
| 7,419,428 B2 | 9/2008 | Rowe .............................. 463/25 |
| 7,422,522 B2 | 9/2008 | Fujimoto et al. ................. 463/16 |
| 7,427,236 B2 | 9/2008 | Kaminkow et al. ............. 463/26 |
| 7,434,805 B2 | 10/2008 | Grauzer et al. ............ 273/149 R |
| 7,438,643 B2 | 10/2008 | Brosnan et al. .................. 463/42 |
| 7,455,591 B2 | 11/2008 | Nguyen ........................... 463/42 |
| 7,460,863 B2 | 12/2008 | Steelberg et al. ............... 455/419 |
| 7,465,231 B2 | 12/2008 | Lewin et al. ..................... 463/37 |
| 7,473,178 B2 | 1/2009 | Boyd et al. ...................... 463/25 |
| 7,483,394 B2 | 1/2009 | Chang et al. .................... 370/254 |
| 7,484,207 B2 | 1/2009 | Sato |
| 7,515,718 B2 | 4/2009 | Nguyen et al. ................. 380/278 |
| 7,534,169 B2 | 5/2009 | Amaitis et al. ................... 463/39 |
| 7,537,216 B2 | 5/2009 | Soltys et al. ................. 273/149 P |
| 7,549,576 B2 | 6/2009 | Alderucci et al. ............. 235/380 |
| 7,566,274 B2 | 7/2009 | Johnson et al. .................. 463/42 |
| 7,575,234 B2 | 8/2009 | Soltys ....................... 273/149 R |
| 7,585,217 B2 | 9/2009 | Lutnick et al. ................... 463/16 |
| 7,594,030 B2 | 9/2009 | Teodosiu et al. |
| 7,607,976 B2 | 10/2009 | Baerlocher et al. |
| 7,607,977 B2 | 10/2009 | Baerlocher et al. |
| 7,610,549 B2 | 10/2009 | Vignet |
| 7,611,407 B1 | 11/2009 | Itkis et al. ....................... 463/29 |
| 7,611,409 B2 | 11/2009 | Muir et al. ....................... 463/29 |
| 7,618,317 B2 | 11/2009 | Jackson |
| 7,621,809 B2 | 11/2009 | Baerlocher et al. |
| 7,634,550 B2 | 12/2009 | Wolber et al. |
| 7,648,414 B2 | 1/2010 | McNutt et al. |
| 7,666,081 B2 | 2/2010 | Baerlocher et al. |
| 7,674,179 B2 | 3/2010 | Baerlocher et al. |
| 7,684,882 B2 | 3/2010 | Baerlocher et al. |
| 7,688,322 B2 | 3/2010 | Kapler et al. |
| 7,689,302 B2 | 3/2010 | Schlottmann et al. |
| 7,699,697 B2 | 4/2010 | Darrah et al. .................... 463/16 |
| 7,699,703 B2 | 4/2010 | Muir et al. ....................... 463/29 |
| 7,702,719 B1 | 4/2010 | Betz et al. |
| 7,706,895 B2 | 4/2010 | Callaghan |
| 7,712,050 B2 | 5/2010 | Gutberlet et al. |
| 7,730,198 B2 | 6/2010 | Ruppert et al. ................ 709/230 |
| 7,747,741 B2 | 6/2010 | Basani et al. .................. 709/224 |
| 7,753,790 B2 | 7/2010 | Nguyen et al. ................... 463/42 |
| 7,769,877 B2 | 8/2010 | McBride et al. ............... 709/230 |
| 7,778,635 B2 | 8/2010 | Crookham et al. .......... 455/426.1 |
| 7,780,526 B2 | 8/2010 | Nguyen et al. ................... 463/29 |
| 7,780,529 B2 | 8/2010 | Rowe et al. |
| 7,785,204 B2 | 8/2010 | Wells et al. |
| 7,787,972 B2 | 8/2010 | Schlottmann et al. |
| 7,805,719 B2 | 9/2010 | O'Neill |
| 7,841,946 B2 | 11/2010 | Walker et al. ................... 463/42 |
| 7,844,944 B2 | 11/2010 | Gutberlet et al. |
| 7,846,020 B2 | 12/2010 | Walker et al. ................... 463/29 |
| 7,850,528 B2 | 12/2010 | Wells .............................. 463/42 |
| 7,862,425 B2 | 1/2011 | Cavagna .......................... 463/25 |
| 7,867,081 B2 | 1/2011 | Schneider et al. ............... 463/25 |
| 7,874,920 B2 | 1/2011 | Hornik et al. .................... 463/42 |
| 7,874,921 B2 | 1/2011 | Baszucki et al. ................. 463/43 |
| 7,886,288 B2 | 2/2011 | Breckner et al. |
| 7,892,093 B2 | 2/2011 | Kniesteadt et al. |
| 7,898,679 B2 | 3/2011 | Brack et al. .................. 358/1.15 |
| 7,901,294 B2 | 3/2011 | Walker et al. ................... 463/42 |
| 7,908,486 B2 | 3/2011 | Gatto et al. |
| 7,909,699 B2 | 3/2011 | Parrott et al. .................... 463/42 |
| 7,918,735 B2 | 4/2011 | Inamura |
| 7,921,026 B2 | 4/2011 | O'Cull et al. |
| 7,921,405 B2 | 4/2011 | Gupta et al. |
| 7,937,464 B2 | 5/2011 | Ruppert et al. ................ 709/224 |
| 7,963,847 B2 | 6/2011 | Baerlocher |
| 8,025,574 B2 | 9/2011 | Hilbert |
| 8,051,180 B2 | 11/2011 | Mazzaferri et al. |
| 8,070,583 B2 | 12/2011 | Baerlocher et al. |
| 8,073,657 B2 | 12/2011 | Moore, III et al. |
| 8,117,461 B2 | 2/2012 | Bigelow, Jr. et al. |
| 8,177,634 B2 | 5/2012 | Herrmann et al. |
| 8,182,346 B2 | 5/2012 | Herrmann et al. |
| 8,187,101 B2 | 5/2012 | Herrmann et al. |
| 8,192,289 B2 | 6/2012 | Herrmann et al. |
| 8,197,344 B2 | 6/2012 | Rathsack et al. |
| 8,201,229 B2 | 6/2012 | Ruppert et al. |
| 8,246,466 B2 | 8/2012 | Herrmann et al. |
| 8,277,324 B2 | 10/2012 | Herrmann et al. |
| 8,280,777 B2 | 10/2012 | Mengerink et al. |
| 8,285,740 B2 | 10/2012 | Graham et al. |
| 8,308,554 B2 | 11/2012 | Rowe et al. |
| 8,360,870 B2 | 1/2013 | Herrmann et al. |
| 8,366,550 B2 | 2/2013 | Herrmann et al. |
| 8,512,150 B2 | 8/2013 | Herrmann et al. |
| 2001/0019966 A1 | 9/2001 | Idaka ............................... 463/40 |
| 2002/0004824 A1 | 1/2002 | Cuan et al. |
| 2002/0111213 A1 | 8/2002 | McEntee et al. ................. 463/42 |
| 2002/0113371 A1 | 8/2002 | Snow ............................. 273/292 |
| 2002/0115487 A1* | 8/2002 | Wells .............................. 463/42 |
| 2002/0116615 A1* | 8/2002 | Nguyen et al. ................. 713/168 |
| 2002/0142825 A1 | 10/2002 | Lark et al. ....................... 463/16 |
| 2002/0142844 A1 | 10/2002 | Kerr ................................ 463/42 |
| 2002/0144115 A1 | 10/2002 | Lemay et al. |
| 2002/0152120 A1 | 10/2002 | Howington |
| 2002/0173354 A1 | 11/2002 | Winans et al. ................... 463/20 |
| 2003/0004871 A1 | 1/2003 | Rowe ............................. 705/39 |
| 2003/0006554 A1 | 1/2003 | Grebler et al. ................. 273/290 |
| 2003/0022714 A1 | 1/2003 | Oliver ............................. 463/25 |
| 2003/0028480 A1 | 2/2003 | Rowe ............................. 705/39 |
| 2003/0032474 A1 | 2/2003 | Kaminkow ...................... 463/25 |
| 2003/0042679 A1 | 3/2003 | Snow ............................. 273/292 |
| 2003/0045354 A1 | 3/2003 | Giobbi ............................ 463/40 |
| 2003/0054881 A1* | 3/2003 | Hedrick et al. .................. 463/29 |
| 2003/0064798 A1 | 4/2003 | Grauzer et al. .................. 463/29 |
| 2003/0075869 A1 | 4/2003 | Breeding et al. .............. 273/292 |
| 2003/0078103 A1 | 4/2003 | LeMay et al. ................... 463/43 |
| 2003/0090064 A1 | 5/2003 | Hoyt et al. ..................... 273/292 |
| 2003/0130024 A1 | 7/2003 | Darby ............................. 463/13 |
| 2003/0137968 A1 | 7/2003 | Lareau et al. ................. 370/349 |
| 2003/0182414 A1 | 9/2003 | O'Neill |
| 2003/0185229 A1 | 10/2003 | Shachar et al. |

(56) References Cited

U.S. PATENT DOCUMENTS

| | | |
|---|---|---|
| 2003/0195037 A1 | 10/2003 | Vuong et al. .................... 463/29 |
| 2003/0206548 A1 | 11/2003 | Bannai et al. ................. 370/389 |
| 2003/0224858 A1 | 12/2003 | Yoseloff et al. ................. 463/43 |
| 2003/0228912 A1 | 12/2003 | Wells et al. ..................... 463/43 |
| 2003/0232651 A1 | 12/2003 | Huard ............................. 463/42 |
| 2004/0002386 A1 | 1/2004 | Wolfe et al. ..................... 463/42 |
| 2004/0002388 A1 | 1/2004 | Larsen et al. ................... 463/43 |
| 2004/0029635 A1 | 2/2004 | Giobbi ............................. 463/30 |
| 2004/0043815 A1 | 3/2004 | Kaminkow ...................... 463/25 |
| 2004/0043820 A1 | 3/2004 | Schlottmann ................... 463/43 |
| 2004/0048671 A1 | 3/2004 | Rowe .............................. 463/42 |
| 2004/0064817 A1 | 4/2004 | Shibayama et al. |
| 2004/0068654 A1 | 4/2004 | Cockerille et al. ............ 713/168 |
| 2004/0082385 A1 | 4/2004 | Silva et al. ...................... 463/40 |
| 2004/0087375 A1 | 5/2004 | Gelinotte ........................ 463/47 |
| 2004/0100026 A1 | 5/2004 | Haggard ........................ 273/304 |
| 2004/0106452 A1 | 6/2004 | Nguyen et al. .................. 463/42 |
| 2004/0110119 A1 | 6/2004 | Riconda et al. ............... 434/350 |
| 2004/0127291 A1 | 7/2004 | George et al. ................... 463/42 |
| 2004/0133485 A1 | 7/2004 | Schoomaker et al. .......... 705/30 |
| 2004/0142744 A1 | 7/2004 | Atkinson et al. ................ 463/29 |
| 2004/0166918 A1 | 8/2004 | Walker et al. ................... 463/16 |
| 2004/0166940 A1 | 8/2004 | Rothschild ...................... 463/42 |
| 2004/0185936 A1 | 9/2004 | Block et al. ..................... 463/42 |
| 2004/0229682 A1 | 11/2004 | Gelinotte ........................ 463/25 |
| 2004/0229684 A1 | 11/2004 | Blackburn et al. |
| 2004/0254010 A1 | 12/2004 | Fine ................................ 463/25 |
| 2004/0254993 A1 | 12/2004 | Mamas |
| 2005/0026680 A1 | 2/2005 | Gururajan ....................... 463/25 |
| 2005/0043094 A1 | 2/2005 | Nguyen et al. .................. 463/42 |
| 2005/0051965 A1 | 3/2005 | Gururajan ...................... 273/292 |
| 2005/0054408 A1 | 3/2005 | Steil et al. ....................... 463/11 |
| 2005/0054438 A1 | 3/2005 | Rothschild et al. ............. 463/29 |
| 2005/0054445 A1 | 3/2005 | Gatto et al. ..................... 463/42 |
| 2005/0055113 A1 | 3/2005 | Gauselmann ................... 700/91 |
| 2005/0070358 A1 | 3/2005 | Angell et al. ................... 463/39 |
| 2005/0080898 A1 | 4/2005 | Block |
| 2005/0098951 A1 | 5/2005 | Groves .......................... 273/292 |
| 2005/0101367 A1 | 5/2005 | Soltys et al. .................... 463/12 |
| 2005/0116417 A1 | 6/2005 | Soltys et al. ................... 273/292 |
| 2005/0119052 A1 | 6/2005 | Russell et al. ................... 463/42 |
| 2005/0143166 A1 | 6/2005 | Walker et al. ................... 463/25 |
| 2005/0153778 A1 | 7/2005 | Nelson et al. ................... 463/42 |
| 2005/0156318 A1 | 7/2005 | Douglas ......................... 257/761 |
| 2005/0164761 A1 | 7/2005 | Tain ................................ 463/13 |
| 2005/0171808 A1 | 8/2005 | Saenz et al. |
| 2005/0181856 A1 | 8/2005 | Cannon et al. .................. 463/16 |
| 2005/0181864 A1 | 8/2005 | Britt et al. ....................... 463/25 |
| 2005/0192099 A1 | 9/2005 | Nguyen et al. |
| 2005/0221882 A1 | 10/2005 | Nguyen et al. .................. 463/16 |
| 2005/0222891 A1 | 10/2005 | Chan et al. ....................... 705/9 |
| 2005/0239542 A1 | 10/2005 | Olsen .............................. 463/27 |
| 2005/0239546 A1* | 10/2005 | Hedrick et al. ................. 463/29 |
| 2005/0282626 A1 | 12/2005 | Manfredi et al. ............... 463/42 |
| 2006/0004618 A1 | 1/2006 | Brixius ............................. 705/8 |
| 2006/0009282 A1 | 1/2006 | George et al. ................... 463/29 |
| 2006/0015716 A1 | 1/2006 | Thornton et al. ............. 713/155 |
| 2006/0019745 A1 | 1/2006 | Benbrahim ..................... 463/29 |
| 2006/0026499 A1 | 2/2006 | Weddle .......................... 715/503 |
| 2006/0035707 A1 | 2/2006 | Nguyen et al. .................. 463/29 |
| 2006/0035713 A1 | 2/2006 | Cockerille et al. |
| 2006/0066444 A1 | 3/2006 | Steeves ......................... 340/10.5 |
| 2006/0079310 A1 | 4/2006 | Friedman et al. ............... 463/16 |
| 2006/0116208 A1 | 6/2006 | Chen et al. ...................... 463/43 |
| 2006/0121970 A1 | 6/2006 | Khal ................................ 463/16 |
| 2006/0183541 A1 | 8/2006 | Okada et al. .................... 463/29 |
| 2006/0195847 A1 | 8/2006 | Amano et al. ................. 718/103 |
| 2006/0196686 A1 | 9/2006 | Gatto et al. |
| 2006/0205508 A1 | 9/2006 | Green ............................. 463/40 |
| 2006/0211481 A1 | 9/2006 | Soltys et al. .................... 463/16 |
| 2006/0217202 A1 | 9/2006 | Burke et al. |
| 2006/0247013 A1 | 11/2006 | Walker et al. ................... 463/20 |
| 2006/0247057 A1 | 11/2006 | Green et al. ..................... 463/42 |
| 2006/0248161 A1 | 11/2006 | O'Brien et al. ................ 709/217 |
| 2006/0252530 A1 | 11/2006 | Oberberger et al. |
| 2006/0253702 A1 | 11/2006 | Lowell et al. |
| 2006/0259604 A1 | 11/2006 | Kotchavi et al. |
| 2006/0277487 A1 | 12/2006 | Poulsen et al. ................. 715/772 |
| 2006/0281556 A1 | 12/2006 | Solomon et al. ................ 463/43 |
| 2006/0287077 A1 | 12/2006 | Grav et al. ...................... 463/27 |
| 2006/0287098 A1 | 12/2006 | Morrow et al. |
| 2007/0004500 A1 | 1/2007 | Soltys et al. .................... 463/22 |
| 2007/0004506 A1* | 1/2007 | Kinsley et al. .................. 463/29 |
| 2007/0006329 A1 | 1/2007 | Morrow et al. ................. 726/34 |
| 2007/0015583 A1 | 1/2007 | Tran ................................ 463/40 |
| 2007/0026935 A1 | 2/2007 | Wolf et al. ....................... 463/25 |
| 2007/0032288 A1 | 2/2007 | Nelson et al. |
| 2007/0033247 A1 | 2/2007 | Martin ........................... 709/201 |
| 2007/0045959 A1 | 3/2007 | Soltys ............................. 273/274 |
| 2007/0054740 A1 | 3/2007 | Salls et al. ...................... 463/42 |
| 2007/0057453 A1 | 3/2007 | Soltys et al. ................ 273/149 P |
| 2007/0057466 A1 | 3/2007 | Soltys et al. ................... 273/292 |
| 2007/0057469 A1 | 3/2007 | Grauzer et al. ................ 273/309 |
| 2007/0060259 A1 | 3/2007 | Pececnik ......................... 463/16 |
| 2007/0060307 A1 | 3/2007 | Mathis et al. ................... 463/25 |
| 2007/0060320 A1 | 3/2007 | Kelly et al. |
| 2007/0060365 A1 | 3/2007 | Tien et al. ....................... 463/42 |
| 2007/0077990 A1 | 4/2007 | Cuddy et al. .................... 463/25 |
| 2007/0077995 A1 | 4/2007 | Oak et al. ........................ 463/42 |
| 2007/0082737 A1 | 4/2007 | Morrow et al. ................. 463/42 |
| 2007/0093298 A1 | 4/2007 | Brunet ............................ 463/42 |
| 2007/0105628 A1 | 5/2007 | Arbogast et al. |
| 2007/0111775 A1 | 5/2007 | Yoseloff ......................... 463/16 |
| 2007/0111791 A1 | 5/2007 | Arbogast et al. ............... 463/40 |
| 2007/0111794 A1 | 5/2007 | Hogan et al. ................... 463/42 |
| 2007/0117608 A1 | 5/2007 | Roper et al. .................... 463/16 |
| 2007/0124483 A1 | 5/2007 | Marples et al. ................ 709/228 |
| 2007/0129145 A1 | 6/2007 | Blackburn et al. .............. 463/42 |
| 2007/0150329 A1 | 6/2007 | Brook et al. ...................... 705/8 |
| 2007/0155490 A1 | 7/2007 | Phillips et al. |
| 2007/0167235 A1 | 7/2007 | Naicker .......................... 463/42 |
| 2007/0191102 A1 | 8/2007 | Coliz et al. ..................... 463/42 |
| 2007/0192748 A1 | 8/2007 | Martin et al. .................. 715/856 |
| 2007/0198418 A1 | 8/2007 | MacDonald ..................... 705/52 |
| 2007/0208816 A1 | 9/2007 | Baldwin et al. |
| 2007/0214030 A1 | 9/2007 | Shear et al. |
| 2007/0216092 A1 | 9/2007 | Fleckenstein ............... 273/149 R |
| 2007/0218998 A1 | 9/2007 | Arbogast et al. ............... 463/42 |
| 2007/0235521 A1 | 10/2007 | Mateen et al. ................ 235/379 |
| 2007/0243925 A1 | 10/2007 | LeMay et al. ................... 463/20 |
| 2007/0243927 A1 | 10/2007 | Soltys ............................. 463/25 |
| 2007/0243935 A1 | 10/2007 | Huizinga ........................ 463/42 |
| 2007/0259709 A1 | 11/2007 | Kelly et al. ..................... 463/20 |
| 2007/0259711 A1 | 11/2007 | Thomas .......................... 463/22 |
| 2007/0287534 A1 | 12/2007 | Fleckenstein .................. 463/29 |
| 2007/0287535 A1 | 12/2007 | Soltys ............................. 463/29 |
| 2007/0298868 A1 | 12/2007 | Soltys ............................. 463/25 |
| 2008/0004108 A1 | 1/2008 | Klinkhammer ................. 463/29 |
| 2008/0009344 A1 | 1/2008 | Graham et al. ................. 463/25 |
| 2008/0026832 A1 | 1/2008 | Stevens et al. ................. 463/26 |
| 2008/0026848 A1 | 1/2008 | Byng .............................. 463/42 |
| 2008/0038035 A1 | 2/2008 | Shuldman et al. ............. 400/76 |
| 2008/0045341 A1 | 2/2008 | Englman ......................... 463/42 |
| 2008/0045342 A1 | 2/2008 | Crowder et al. |
| 2008/0045344 A1 | 2/2008 | Schlottmann et al. .......... 463/25 |
| 2008/0058105 A1 | 3/2008 | Combs et al. |
| 2008/0064501 A1 | 3/2008 | Patel ............................... 463/40 |
| 2008/0065590 A1 | 3/2008 | Castro et al. |
| 2008/0076572 A1 | 3/2008 | Nguyen et al. .................. 463/42 |
| 2008/0085772 A1 | 4/2008 | Iddings et al. |
| 2008/0090651 A1 | 4/2008 | Baerlocher ..................... 463/27 |
| 2008/0096659 A1 | 4/2008 | Kreloff et al. ................... 463/39 |
| 2008/0102919 A1 | 5/2008 | Rowe et al. |
| 2008/0102932 A1 | 5/2008 | Anderson et al. |
| 2008/0108405 A1 | 5/2008 | Brosnan et al. |
| 2008/0108433 A1 | 5/2008 | DiMichele et al. ............. 463/40 |
| 2008/0113764 A1 | 5/2008 | Soltys ............................. 463/22 |
| 2008/0113773 A1 | 5/2008 | Johnson et al. ................. 463/25 |
| 2008/0113781 A1 | 5/2008 | Soltys et al. .................... 463/28 |
| 2008/0119284 A1 | 5/2008 | Luciano, Jr. et al. ........... 463/42 |
| 2008/0127174 A1 | 5/2008 | Johnson |
| 2008/0138773 A1 | 6/2008 | Lathrop |
| 2008/0146337 A1 | 6/2008 | Halonen et al. ................. 463/42 |
| 2008/0153599 A1 | 6/2008 | Atashband et al. ............. 463/42 |

(56) References Cited

U.S. PATENT DOCUMENTS

| | | | |
|---|---|---|---|
| 2008/0153600 A1 | 6/2008 | Swarna | 463/43 |
| 2008/0154916 A1 | 6/2008 | Atashband | 707/10 |
| 2008/0155665 A1 | 6/2008 | Ruppert et al. | 726/5 |
| 2008/0162729 A1 | 7/2008 | Ruppert | 709/249 |
| 2008/0165771 A1 | 7/2008 | Gainey et al. | |
| 2008/0171588 A1 | 7/2008 | Atashband | 463/20 |
| 2008/0171598 A1 | 7/2008 | Deng | 463/40 |
| 2008/0200255 A1 | 8/2008 | Eisele | 463/42 |
| 2008/0243697 A1 | 10/2008 | Irving et al. | 705/54 |
| 2008/0244565 A1 | 10/2008 | Levidow et al. | |
| 2008/0261699 A1 | 10/2008 | Topham et al. | |
| 2008/0261701 A1 | 10/2008 | Lewin et al. | 463/43 |
| 2008/0287197 A1 | 11/2008 | Ruppert et al. | 463/42 |
| 2008/0293494 A1 | 11/2008 | Adiraju et al. | 463/42 |
| 2008/0300046 A1 | 12/2008 | Gagner et al. | |
| 2008/0311971 A1 | 12/2008 | Dean | 463/20 |
| 2008/0313282 A1 | 12/2008 | Warila et al. | |
| 2008/0318655 A1 | 12/2008 | Davies | |
| 2008/0318685 A9 | 12/2008 | Oak et al. | 463/42 |
| 2009/0005176 A1 | 1/2009 | Morrow et al. | 463/43 |
| 2009/0005177 A1 | 1/2009 | Kishi et al. | |
| 2009/0011833 A1 | 1/2009 | Seelig et al. | 463/42 |
| 2009/0029775 A1 | 1/2009 | Ruppert et al. | 463/42 |
| 2009/0031008 A1 | 1/2009 | Elliott et al. | 709/220 |
| 2009/0054139 A1 | 2/2009 | Anderson | |
| 2009/0063309 A1 | 3/2009 | Stephens | |
| 2009/0069076 A1 | 3/2009 | Silvestro | |
| 2009/0115133 A1 | 5/2009 | Kelly et al. | 273/274 |
| 2009/0117994 A1 | 5/2009 | Kelly et al. | 463/25 |
| 2009/0118001 A1 | 5/2009 | Kelly et al. | 463/29 |
| 2009/0118005 A1 | 5/2009 | Kelly et al. | 463/31 |
| 2009/0118006 A1 | 5/2009 | Kelly et al. | 463/31 |
| 2009/0124329 A1 | 5/2009 | Palmisano | |
| 2009/0124392 A1 | 5/2009 | Ruppert et al. | 463/42 |
| 2009/0124394 A1 | 5/2009 | Swarna | 463/43 |
| 2009/0125603 A1 | 5/2009 | Atashband et al. | 709/220 |
| 2009/0131144 A1 | 5/2009 | Allen | 463/20 |
| 2009/0131163 A1 | 5/2009 | Arbogast et al. | 463/29 |
| 2009/0132720 A1 | 5/2009 | Ruppert et al. | 709/231 |
| 2009/0170594 A1 | 7/2009 | Delaney et al. | 463/25 |
| 2009/0176556 A1 | 7/2009 | Gagner et al. | 463/25 |
| 2009/0176578 A1 | 7/2009 | Herrmann et al. | |
| 2009/0176580 A1 | 7/2009 | Herrmann et al. | 463/43 |
| 2009/0181776 A1 | 7/2009 | Deng | 463/42 |
| 2009/0239667 A1 | 9/2009 | Rowe et al. | |
| 2009/0253483 A1 | 10/2009 | Pacey et al. | 463/20 |
| 2009/0270170 A1 | 10/2009 | Patton | 463/36 |
| 2009/0275394 A1 | 11/2009 | Young et al. | 463/25 |
| 2009/0275400 A1 | 11/2009 | Rehm et al. | 463/27 |
| 2009/0275401 A1 | 11/2009 | Allen et al. | 463/29 |
| 2009/0275402 A1 | 11/2009 | Backover et al. | 463/29 |
| 2009/0276341 A1 | 11/2009 | McMahan et al. | 705/30 |
| 2009/0298583 A1 | 12/2009 | Jones | 463/29 |
| 2009/0307069 A1 | 12/2009 | Meyerhofer | 705/14.12 |
| 2010/0016067 A1 | 1/2010 | White et al. | 463/25 |
| 2010/0016068 A1 | 1/2010 | White et al. | 463/25 |
| 2010/0029385 A1 | 2/2010 | Garvey et al. | 463/35 |
| 2010/0048291 A1 | 2/2010 | Warkentin | 463/25 |
| 2010/0058320 A1 | 3/2010 | Milligan et al. | |
| 2010/0062838 A1 | 3/2010 | Nguyen et al. | |
| 2010/0093440 A1 | 4/2010 | Burke | |
| 2010/0093441 A1 | 4/2010 | Rajaraman et al. | |
| 2010/0124990 A1 | 5/2010 | Crowder | |
| 2010/0125851 A1 | 5/2010 | Singh et al. | |
| 2010/0130280 A1 | 5/2010 | Arezina et al. | 463/20 |
| 2010/0131772 A1 | 5/2010 | Atashband et al. | |
| 2010/0151926 A1 | 6/2010 | Ruppert et al. | 463/1 |
| 2010/0161798 A1 | 6/2010 | Ruppert et al. | 709/225 |
| 2010/0210353 A1 | 8/2010 | Gagner et al. | |
| 2010/0234104 A1 | 9/2010 | Ruppert et al. | |
| 2010/0248842 A1 | 9/2010 | Ruppert | 463/42 |
| 2011/0009184 A1 | 1/2011 | Byng | 463/20 |
| 2011/0111826 A1 | 5/2011 | Baerlocher et al. | |
| 2011/0124417 A1 | 5/2011 | Baynes et al. | 463/43 |
| 2011/0179409 A1 | 7/2011 | Yoseloff et al. | |
| 2011/0269534 A1 | 11/2011 | Kelly et al. | |
| 2012/0110649 A1 | 5/2012 | Murphy | |
| 2012/0203692 A1 | 8/2012 | Olliphant et al. | |

FOREIGN PATENT DOCUMENTS

| | | |
|---|---|---|
| EP | 1463008 A2 | 9/2004 |
| GB | 2 380 143 A | 4/2003 |
| GB | 2 382 034 A | 5/2003 |
| JP | 8255059 | 10/1996 |
| KR | 2001-0084838 | 9/2001 |
| KR | 2002-0061793 | 7/2002 |
| KR | 2003-0091635 | 12/2003 |
| WO | 96/36253 A1 | 11/1996 |
| WO | 02/05914 A1 | 1/2002 |
| WO | 03/060846 A2 | 7/2003 |
| WO | 2005/035084 | 4/2005 |
| WO | 2006/005047 A2 | 1/2006 |
| WO | 2007/033207 A2 | 3/2007 |

OTHER PUBLICATIONS

Bally TMS, "MP21—Automated Table Tracking/Features," 2 pages, Nov. 2005.
Bally TMS, "MPBacc—Specifications/Specifications," 2 pages, Nov. 2005.
Bally TMS, "MPLite—Table Management System/Features," 2 pages, Nov. 2005.
Bulaysky, J., "Tracking the Tables," *Casino Journal*, May 2004, pp. 44-47, accessed Dec. 21, 2005, URL=http://www.ascendgaming.com/cj/vendors_manufacturers_table/Trackin916200411141AM.htm, 5 pages.
Burke, A., "Tracking the Tables," reprinted from *International Gaming & Wagering Business*, Aug. 2003, 4 pages.
Casino Software & Services, LLC., accessed Aug. 25, 2006, URL=http:/casinosoftware.com/home.html, 6 pages.
Griffin, P., *The Theory of Blackjack*, GBC Press, Las Vegas, Nevada, 1979, 190 pages.
Gros, R., "All You Ever Wanted to Know About Table Games," reprinted from *Global Gaming Business*, Aug. 1, 2003, 2 pages.
MagTek, "Port Powered Swipe Reader," Technical Reference Manual, Manual Part No. 99875094 Rev 12, Jun. 2003, 20 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Pro, L.V., "Book Review—The Card Counter's Guide to Casino Surveillance," *Blackjack Insider Newsletter*, May 2003, #40, accessed Aug. 25, 2006, URL—http:/bjinsider.com/newsletter 40 surveillance.shtml, 5 pages.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents The Ultimate Player Rating System . . . Bloodhound Sniffs Out the Pros and Cons," Dec. 31, 1997, 6 pages.
Snyder, A., "The High-Tech Eye," excerpt from *Blackjack Forum*, Spring 1997, accessed Dec. 21, 2005, from Casino Software & Services, LLC, URL=http://www.casinosoftware.com/bj_forum.html.
Terdiman, D., "Who's Holding the Aces Now?", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL=http://www.casinosoftware.com/gaming_today.html.
Winkler, C., "Product Spotlight: MindPlay," reprinted from *Gaming and Leisure Technology*, Fall 2003, 2 pages.
Singh et al., U.S. Appl. No. 12/271,337, filed Nov. 14, 2008, 35 pages.
Crowder, U.S. Appl. No. 12/271,736, filed Nov. 14, 2008, 35 pages.
Rajaraman et al., U.S. Appl. No. 12/500,298, filed Jul. 9, 2009, 50 pages.
Atashband et al., U.S. Appl. No. 12/620,402, filed Nov. 16, 2009, 46 pages.

(56) References Cited

OTHER PUBLICATIONS

Ruppert et al., U.S. Appl. No. 12/620,404, filed Nov. 16, 2009, 70 pages.
International Search Report, mailed Nov. 27, 2009, for PCTAN PCT/US2009/042156, 3 pages.
Written Opinion, mailed Nov. 27, 2009, for PCTAN PCT/US2009/042156, 3 pages.
Patent Examination Report No. 1, for corresponding Australian patent application No. 2009243035, dated Oct. 29, 2013, 3 pages.
Office Action, with English translation, for corresponding Chinese Patent Application No. 200980120367.4, dated Dec. 28, 2012, 15 pages.
"BOB and LDAP," Gaming Standards Association, Fremont, California, 7 pages, Oct. 26, 2003.
"GSA Point-to-Point SOAP/HTTPS Transport and Security Specification v1.0.3," Gaming Standards Association TRANSPORT Technical Committee, 16 pages, Jun. 5, 2007.
Gwyddion User Guide, "False Color Mapping: Chapter 3. Getting Started," retrieved from URL=http://sourceforge.net/projects/gwyddion/files/user-guide/2007-06-28/gwyddion-user-guide-xhtml-2007-06-28.tar.gz/download, retrieved on Nov. 21, 2012, 2 pages.
Hung et al., "Performance Evaluation of the Least Conflict Sharable Spreading Code Assignment Algorithm," IEEE, 1996, 5 pages.
Olesiejuk, "Discovery Services for Gaming Devices on a Casino Floor," Gaming Standards Association, 3 pages, Mar. 12, 2007.
Requirements document, "Game Authentication Terminal Program (GAT3)," to Gaming Standards Association, Aug. 2005, 27 pages.
Standards document, "Technical Standards for Gaming Devices and On-Line Slot Systems," to Nevada Gaming Commission and State Gaming Control Board, Aug. 17, 2005, 15 pages.

\* cited by examiner

SYSTEMS AND METHODS FOR OUT-OF-BAND GAMING MACHINE MANAGEMENT

BACKGROUND

1. Technical Field

This disclosure generally relates to gaming machines and more particularly to management of gaming machines.

2. Description of the Related Art

At a casino, electronic gaming machines may be clustered together in a relatively small geographical region such as a casino floor. Electronic gaming machines may also be distributed over a relatively large geographical region as is the case when electronic gaming machines provide lottery tickets for a state-run lottery.

Electronic gaming machines may be communicatively coupled to a management server. The management server may monitor the electronic gaming machines. The management server may reconfigure electronic gaming machines with which it has an active communication path. However, when the communication path between the management server and a gaming machine is down, the management server cannot monitor or reconfigure the gaming machine. Among other reasons, the communication path between the gaming machine and the management server may be down because the gaming machine is powered off or the gaming machine has crashed, i.e., the gaming machine is powered on but an operating system of the gaming machine is not being executed.

BRIEF SUMMARY

There exists a need for remote monitoring, as well as remote reconfiguration and remote diagnostics and repair, of gaming machines.

In one aspect, the present disclosure is directed to an electronic gaming machine that includes a core processor electrically powered by a power supply when the gaming machine is in a powered on state and electrically isolated from any power supply when the gaming machine is in a powered off state, the core processor executing instructions in the powered on state; a memory in communication with the core processor and having instructions stored therein that cause the processor to execute a game title on an operating system of the gaming machine; a remote management controller electrically powered by the power supply when the gaming machine is in either one of the powered off state or the powered on state, the remote management controller operable to provide remote access to the gaming machine; and an unalterable boot up procedure for the gaming machine. The electronic gaming machine may further include a non-volatile memory electrically powered by the power supply when the gaming machine is in either one of the powered off state or the powered on state. The non-volatile memory may store event logs, wherein the remote management controller is operable to provide the event logs over an out-of-band channel to a remote computing device. The non-volatile memory may store authentication information, wherein the remote management controller is operable to provide the authentication information over an out-of-band channel to a remote computing device. The non-volatile memory may store an indicator of at least one software title stored in the memory, wherein the remote management controller is operable to provide the indicator of at least one software title over an out-of-band channel to a remote computing device.

In another aspect, the present disclosure is directed to a method of managing a plurality of remote gaming machines that includes: configuring each respective gaming machine of the plurality of gaming machines to enable remote access while an operating system of the respective gaming machine is not being executed; configuring each respective gaming machine of the plurality of gaming machines to have a respective unalterable boot up; and accessing a respective first memory of a respective gaming machine while the operating system of the respective gaming machine is not being executed for at least one respective gaming machine of the plurality of gaming machines. In some embodiments, accessing a respective memory of a respective gaming machine may further include retrieving a respective software title indicator of at least one respective software title stored in a respective second memory storing of the respective software title. This may include managing a portfolio of licenses for software titles based at least on software title indicators retrieved from the plurality of gaming machines. Managing a portfolio of licenses for software titles may include determining at total number of the gaming machines which store a respective software title, wherein a respective license for the respective software title is included in the portfolio of software titles. In some embodiments, accessing a respective memory of a respective gaming machine may further include retrieving a respective event log for the respective gaming machine while a core processor for executing the operating system is powered and concurrently while the operating system of the respective gaming machine is not being executed. This may further include providing the respective gaming machine with a repair storage device image and initiating a reboot of the respective gaming machine. In some embodiments, accessing a respective memory of a respective gaming machine may include retrieving a respective diagnostic indicator for the respective gaming machine while a core processor for executing the operating system is powered off. In some embodiments, accessing a respective memory of a respective gaming machine may further include retrieving a respective authentication indicator for the respective gaming machine while a core processor for executing the operating system is powered off. This may further include verifying the authentication indicator for the respective gaming machine. In some embodiments, accessing a respective memory of a respective gaming machine may further include retrieving an asset indicator of at least one respective asset of a respective gaming machine. This may include managing a portfolio of assets based at least on asset indicators retrieved from the plurality of gaming machines. Managing a portfolio of assets may include determining a total number of the gaming machines which include a respective asset, wherein a respective license for the respective asset is included in the portfolio of assets.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems, computing devices, communications devices and/or with gaming machines have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Any process descriptions or blocks in flowcharts described below may be understood as representing modules, segments, or portions of code which include one or more executable instructions for implementing specific logical functions. In alternative embodiments, various logical functions, or acts may be executed out of order from that shown or discussed, including substantially concurrently or in reverse order, and/or manually, depending on the functionality involved, as would be understood by those reasonably skilled in the art.

Figure 1:
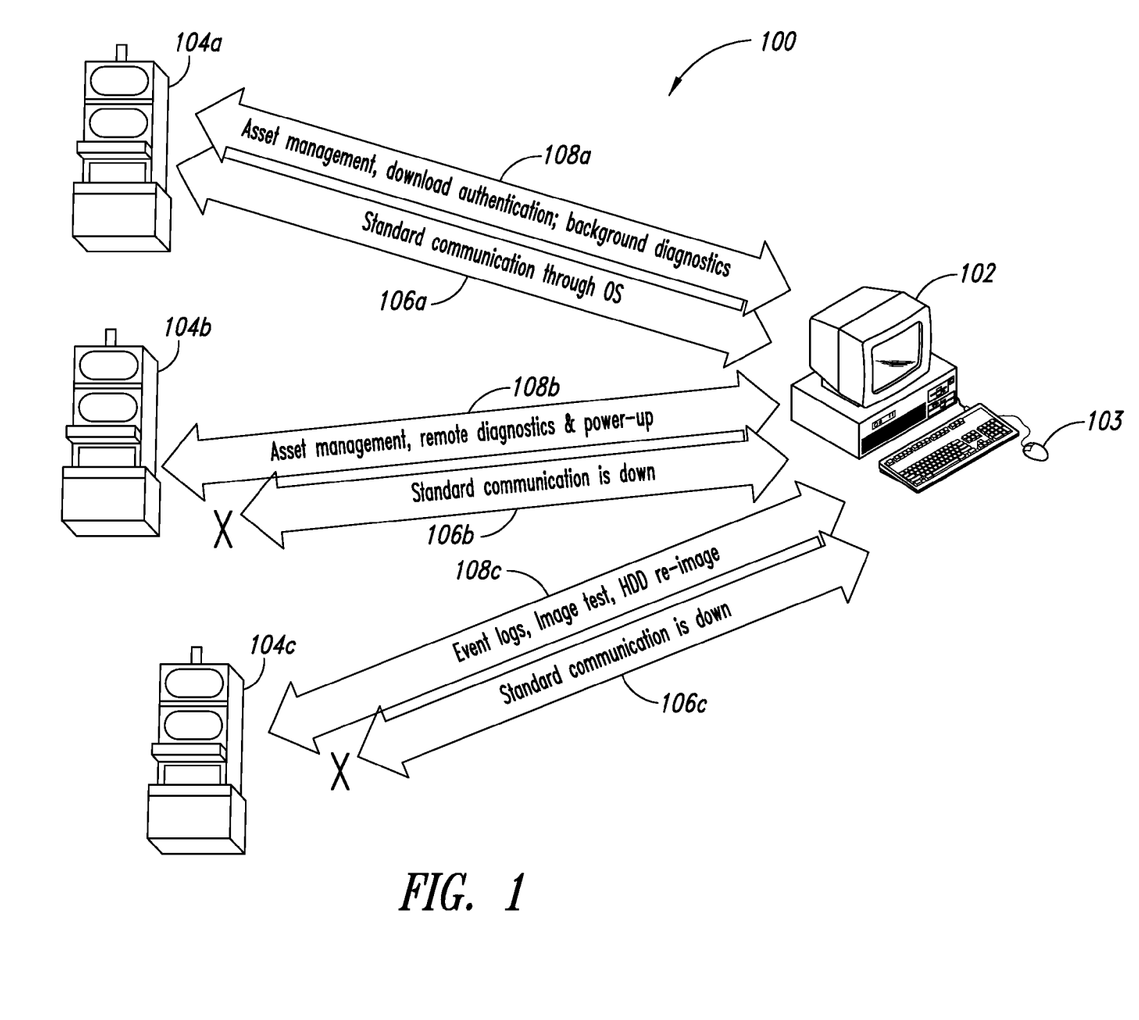
FIG. 1 is a schematic diagram of a gaming machine management system according to one non-limiting illustrated embodiment.

FIG. 1 shows a schematic diagram of a gaming machine management system 100 according to one non-limiting illustrated embodiment. The gaming machine management system 100 has a gaming machine management server 102 that is in remote communication with at least one gaming machine. While FIG. 1 shows three gaming machines, individually referenced as 104a-104c and collectively referenced as 104, it is to be understood that the gaming machine management system 100 may include more or less gaming machines 104. The illustrated embodiment is provided merely for the sake of clarity and the number of gaming machines is not limited thereto.

In the embodiment shown in FIG. 1, the gaming machine 104a is in a powered on state with an executing operating system. The gaming machine 104a is communicatively coupled to the game management server 102 by an in-band communication channel 106a. Communications carried by the in-band communication channel 106a are at an "operating system" level and include communications provided by an operating system of the gaming machine 104a and communications provided to the operating system of the gaming machine 104a.

The gaming machines 104b, 104c are configured to communicate with the game management server 102 via in-band communication channels 106b, 106c, respectively, when said communication channels 106b, 106c are "up" or operative. In-band communication channels are collectively referenced as 106.

In the embodiment shown in FIG. 1, the communication channels 106b, 106c between the game management server 102 and the gaming machines 104b, 104c, respectively, are shown as being broken or inoperative such that there is no communication via the respective communication channels 106b, 106c.

In the embodiment shown in FIG. 1, the gaming machine 104b is in a powered off state. In the powered off state, the gaming machine 104b uses an amount of electrical current such that the gaming machine 104b may be re-booted faster than it would otherwise re-boot. In the powered off state, an operating system of the gaming machine is not being executed, and consequently, standard communications via the communication channel 106b are "down" or inoperative.

In the embodiment shown in FIG. 1, the gaming machine 104c is in a powered on state, but an operating system of the gaming machine 104c is not executing. In other words, the gaming machine 104c may be a state similar to a "crashed" personal computer. In this case, the operating system of the gaming machine is not being executed, and consequently, standard communications via the communication channel 106c are down.

In some embodiments, the gaming machine 104c is in a powered on state, but standard communications via the communication channel 106c are down. This situation may arise when an application on the gaming machine 104c freezes or crashes in such a way that the communication channel 106c is brought down, even if the operating system is being executed concurrently.

Each one of the gaming machines 104 is communicatively coupled to the game management server 102 by an out-of-band communication channel, individually referenced as 108a-108c and collectively referenced as 108. Among other things, the out-of-band channels 108 enable the game management server 102 to remotely monitor and manage the gaming machines 104. Among other things, communications carried by the out-of-band channels 108 may be at a service level or a device level and may include communications carrying information such as hardware self-test information.

Out-of-band communications from the gaming machine 104a, which is powered on with an executing operating system, may include information related to asset management of the gaming machine, authentication information, background diagnostics, etc. Asset management information may include information indicative of software loaded on the gaming machine 104. Authentication information may include information indicative of a configuration of the gaming machine 104. For example, authentication information may include information related to a core processor speed, capacity of a hard drive, an operating system version, a boot-up procedure version, game titles, peripheral devices, authentication certificates, authentication keys such as private/public key pairs, a hash of some quantity such as a key or software, a signed software image, etc. Background diagnostic information may include information indicative of a memory integrity check, an image of a hard drive, etc.

Similarly, out-of-band communications from the gaming machine 104b, which is powered off, may include information related to asset management of the gaming machine, authentication information, background diagnostics, etc.

Out-of-band communications from the gaming machine 104c, which is powered on without an executing operating system, may include information related to diagnostics such as event logs of the gaming machine 104c, image tests, etc. Out-of-band communications to the gaming machine 104c may include repair information for correcting a crash of the gaming machine 104c such as a hard drive re-image, etc.

In some embodiments, the gaming machines 104 may be geographically distributed over a large region. For example, the gaming machines 104 may be lottery ticket dispensing machines for a state-run lottery. Alternatively, the gaming machines 104 may be distributed over a relatively small geographic region such as a casino, airport, lounge, or gas station. In some embodiments, the gaming management system 100 may include distributed clusters of gaming machines 104, an example of which may be multiple geographically distributed casinos where each casino has a cluster of gaming machines 104. In any case, the game management server 102 may manage, monitor, reconfigure, authenticate, verify, and perform diagnostics and repair of the gaming machines 104. The game management server 102 may remotely access the gaming machines 104, perform remote diagnostics and repairs, provide remote downloads, remotely power on/off, and reboot the gaming machines 104.

An access control device 103 may be coupled to the game management server 102 for limiting access to the game management server 102 to only authorized personnel. The access control device 103 may take a variety of forms such as a biometric identification device, a security card reader, etc.

In some embodiments, communications via one or both of the in-band channel 106 and the out-of-band channel 108 may be encrypted. In that case, unauthorized personnel will not be able to hack into the gaming machines 106 via the encrypted channel(s).

In some embodiments, the game management server 102 generates an activity log. The activity log may include information such an indicator of past operators, past operations, accessed gaming machines 104, time of access, etc. In other words, the activity log may show who performed or attempted to perform what operation on which gaming machine and when.

Figure 2:
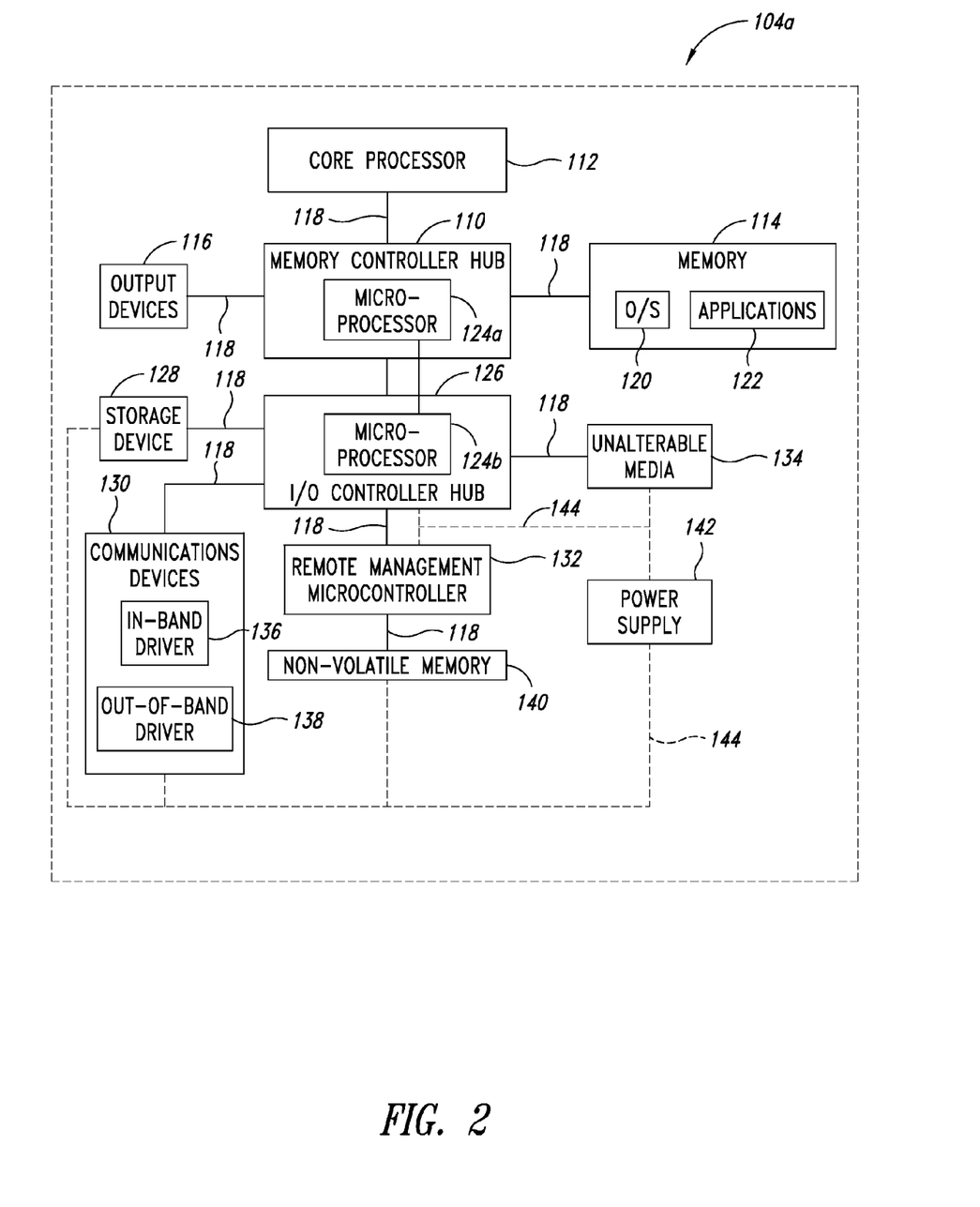
FIG. 2 is a schematic diagram of the gaming machine of FIG. 1, according to one non-limiting illustrated embodiment.

FIG. 2 shows a schematic diagram of the gaming machine 104a, which is representative of the gaming machines 104b, 104c, according to one non-limiting illustrated embodiment. The gaming machine 104a has a memory controller hub 110 that is communicatively coupled to a core processor 112, a memory 114, and output devices 116 by one or more buses 118.

The core processor 112 may be a device for executing software, particularly that stored in the memory 114. The core processor 112 may be a custom made or commercially available processor, a central processing unit (CPU), a semiconductor based microprocessor (in the form of a microchip or chip set), or generally any device for executing software instructions.

The memory 114 may include any one or combination of volatile memory elements such as a read-only memory (ROM) and a random access memory (RAM). The random access memory (RAM) may include dynamic random-access memory (DRAM), static random-access memory (SRAM), synchronous dynamic random-access memory (SDRAM), flash RAM, etc.

The memory 114 may store one or more logic modules or logic routines, each of which may comprise an ordered listing of executable instructions for implementing logical functions. In particular, the memory 114 stores an operating system 120 and applications 122. The execution of the operating system 120 by the core processor 112 essentially controls the execution of other logic, such as applications 122, and provides scheduling, input-output control, file and data management, memory management, and communication control and related services. The applications 122 include one or more ordered listings of executable instructions for implementing logical functions for a game title, e.g., blackjack, poker, roulette, slot games, etc.

The output devices 116 may include user interface devices such as display devices and/or various output cards such as graphics cards.

The memory controller hub 110 has a microprocessor 124a. Among other things, the microprocessor 124a has a management engine. The management engine may take a variety of forms including firmware. The management engine implements various services on behalf of management applications.

The gaming machine 104a further includes an input/output controller hub 126 that is communicatively coupled to a storage device 128, communications devices 130, a remote management microcontroller 132, and an unalterable media 134 by one or more buses 118. The input/output controller hub 126 has a microprocessor 124b that embodies a management engine. The management engine may take a variety of forms including firmware. The management engine implements various services on behalf of management applications.

The storage device 128 may take a variety of forms such as, but not limited to, a hard drive, a CD-drive, a DVD drive, etc.

The communications devices 130 may include a network interface card and/or wireless communication devices such as, but not limited to, Ethernet devices and/or 802.11 devices that provide a communication link with the gaming machine management server 102. The communication link may be a wireless communication link, a wired communication link or media, an optical fiber, etc., and/or a combination thereof. The communication link may provide both the in-band channel 106 and the out-of-band channel 108. Alternatively, a first communication link may provide the in-band channel 106, and a second communication link may provide the out-of-band channel 108. The communications devices 130 include an in-band module 136 and an out-of-band module 138. The in-band module 136 provides system level communications with the gaming machine management server 102 via the in-band channel 106. The out-of-band module 138 provides out-of-band communications via the out-of-band channel 108.

The remote management microcontroller 132 facilitates remote out-of-band management of the gaming machine 104. The remote management microcontroller 132 may take a variety of forms such as a small microprocessor with firmware. The firmware may be stored in a non-volatile memory 140. The non-volatile memory 140 may take the form of flash memory. The remote management microcontroller 132 may include a built-in web server that is remotely accessible. The non-volatile memory 140 may store, among other things, authentication information and diagnostic information. Additionally, the gaming machine 104 is typically secured from unauthorized access to the physical components of the gaming machine 104 via a door of a cabinet that houses the gaming machine 104. The non-volatile memory 140 may store door access information indicative of when the gaming machine was opened for physical access to components of the gaming machine, who accessed the gaming machine, and what operation, change, and/or modification occurred or was attempted. Additionally, the non-volatile memory 140 may store software title indicators that are indicative of software titles stored in the memory 114.

In some embodiments, the gaming machine management server 102 may configure the gaming machine 104a to store selected information in the non-volatile memory 140. For example, the gaming machine management server 102 may specify components, modules, software, etc. that are considered as an asset. The non-volatile memory 140 may store a respective asset indicator that is indicative of the gaming machine 104a having one of the specified assets.

The unalterable media 134 may take the form of a read-only memory. The unalterable media 134 may store firmware for booting up the gaming machine 104a similar to Basic Input/Output System (BIOS) firmware of many personal computers. When the gaming machine 104a is first powered on, the boot-up firmware stored in the unalterable media 134 identifies and initiates various hardware components of the gaming machine 104a. Obviously, the firmware for booting up the gaming machine 104a cannot be updated if the firmware is stored in the unalterable media 134. However, by storing the firmware in the unalterable media 134, the firmware cannot be tampered with by either authorized or unauthorized personnel. Consequently, the gaming machine 104a is more secure with the boot-up firmware stored in the unalterable media 134 than stored in a writeable media.

The gaming machine 104a further includes a power supply 142 that is electrically coupled to various components of the gaming machine 104a via an electrically conductive medium 142. The gaming machine 104a is configured such that various components of the gaming machine 104a are electrically powered by the power supply 142 even when the gaming machine 104a is "powered off." The input/output controller hub 126, the storage device 128, communications devices 130, the remote management microcontroller 132, unalterable media 134 and non-volatile memory 140 may receive a small amount of electrical current from the power supply 142 when the gaming machine 104a is powered off. The amount of electrical current supplied to various components of the gaming machine 104a is sufficient for the operation of the remote management microcontroller 132 and for out-of-band communication with the gaming machine management server 102.

In some embodiments, various components and/or functions of the gaming machine 104a such as the remote management microcontroller 132 and the management engine may be embodied in Intel® Active Management Technology.

Method of Asset Management

Figure 3A:
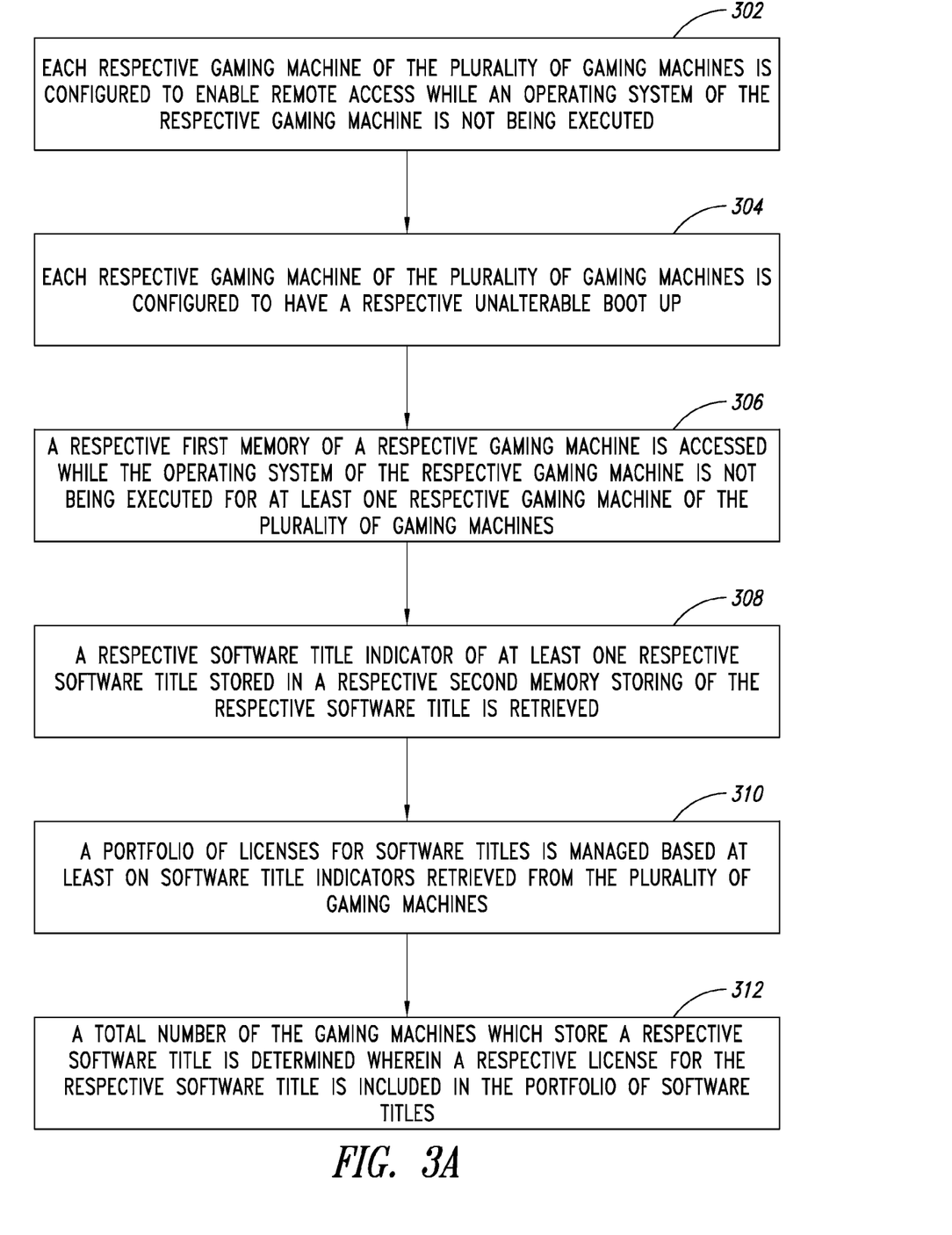
FIGS. 3A-3C are a flow diagram of a process to manage a plurality of remote gaming machines.
Figure 3B:
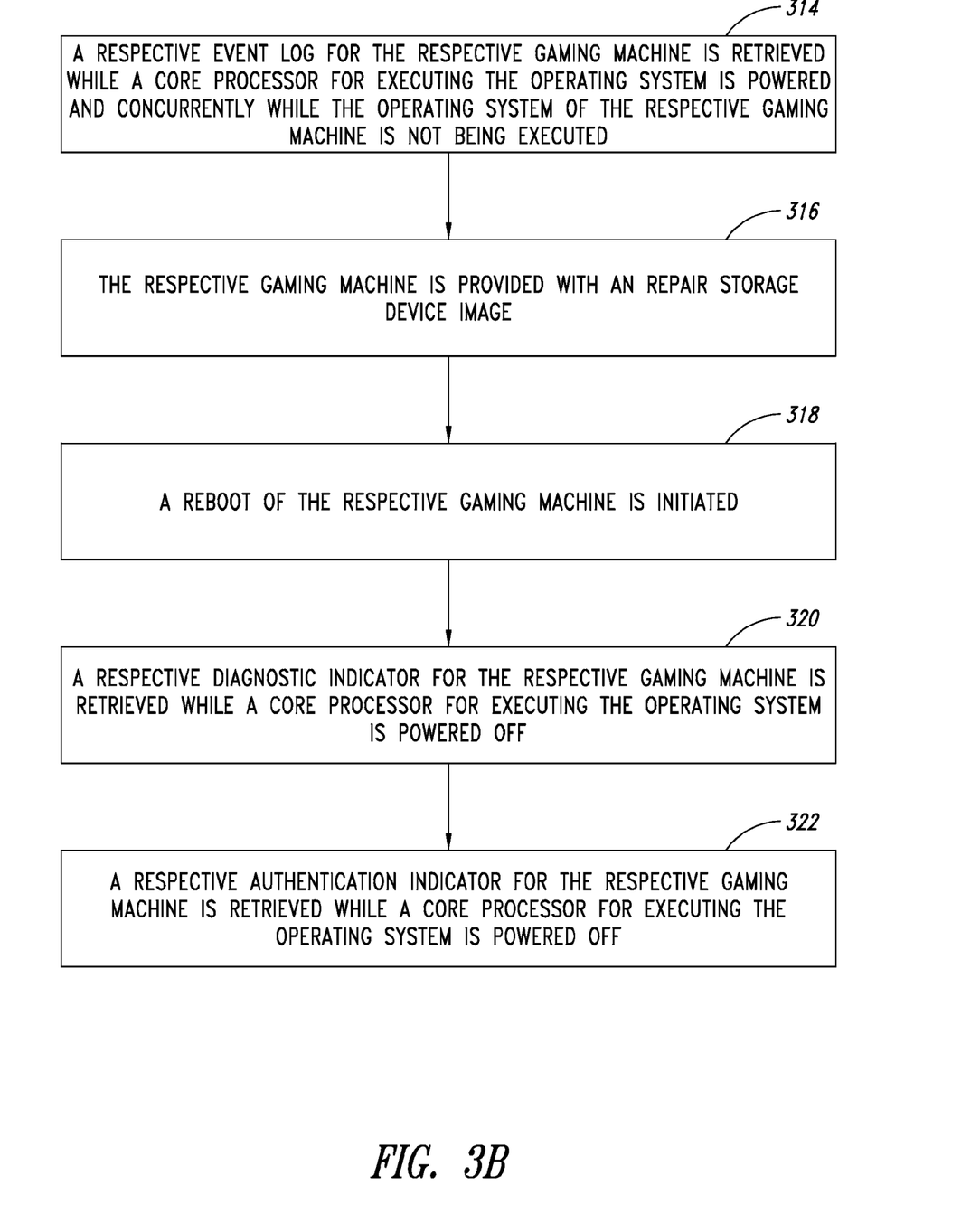
Figure 3C:
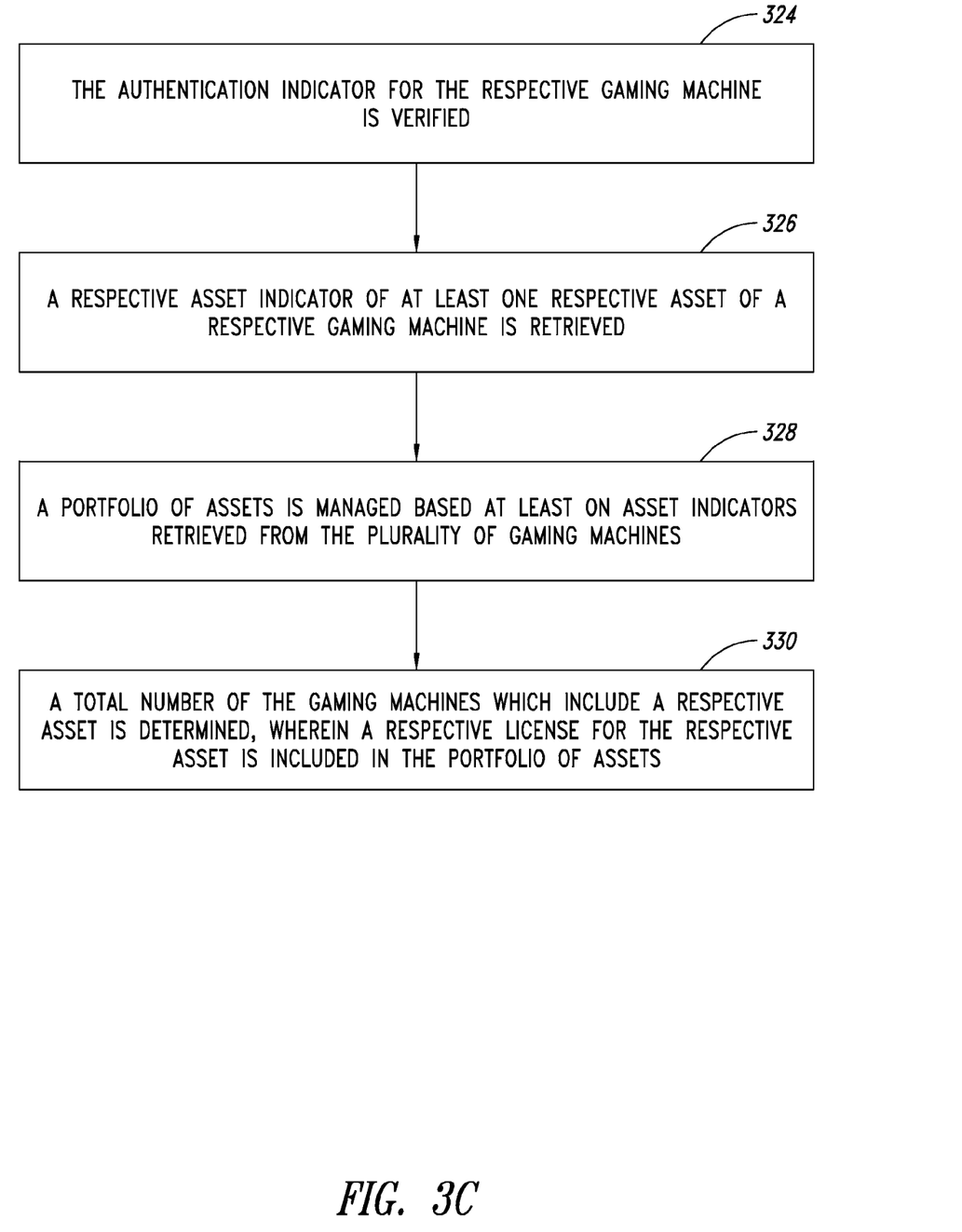

FIGS. 3A-3C show a flow chart of an exemplary process 300 to manage managing a plurality of remote gaming machines according to one non-limiting illustrated embodiment. Certain acts in the processes or process flow described in all of the logic flow diagrams referred to below must naturally precede others to function as described. However, the various embodiments are not limited to the order of the acts described if such order or sequence does not alter the functionality of one or more of the embodiments. That is, it is recognized that some acts may be performed before, after, or in parallel with other acts. Further, some embodiments may include additional acts and/or omit other acts.

At 302, each respective gaming machine of the plurality of gaming machines is configured to enable remote access while an operating system of the respective gaming machine is not being executed.

At 304, each respective gaming machine of the plurality of gaming machines is configured to have a respective unalterable boot up sequence. The unalterable boot up initializes and identifies various hardware components of the gaming machine when the gaming machine is powered on.

At 306, a respective first memory of a respective gaming machine is accessed while the operating system of the respective gaming machine is not being executed for at least one respective gaming machine of the plurality of gaming machines.

At 308, which may be optional in some embodiments, a respective software title indicator of at least one respective software title stored in a respective second memory storing of the respective software title is retrieved.

At 310, which may be optional in some embodiments, a portfolio of licenses for software titles is managed based at least on software title indicators retrieved from the plurality of gaming machines.

At 312, which may be optional in some embodiments, a total number of the gaming machines which store a respective software title is determined wherein a respective license for the respective software title is included in the portfolio of software titles.

At 314, which may be optional in some embodiments, a respective event log for the respective gaming machine is retrieved while a core processor for executing the operating system is powered and concurrently while the operating system of the respective gaming machine is not being executed.

At 316, which may be optional in some embodiments, the respective gaming machine is provided with a repair storage device image. The repair storage device image may be an image of a memory or a portion of a memory, such as memory 114, and/or may be an image of a hard drive.

At 318, which may be optional in some embodiments, a reboot of the respective gaming machine is initiated.

At 320, which may be optional in some embodiments, a respective diagnostic indicator for the respective gaming machine is retrieved while a core processor for executing the operating system is powered off.

At 322, which may be optional in some embodiments, a respective authentication indicator for the respective gaming machine is retrieved while a core processor for executing the operating system is powered off.

At 324, which may be optional in some embodiments, the authentication indicator for the respective gaming machine is verified.

At 326, which may be optional in some embodiments, a respective asset indicator of at least one respective asset of a respective gaming machine is retrieved.

At 328, which may be optional in some embodiments, a portfolio of assets is managed based at least on asset indicators retrieved from the plurality of gaming machines.

At 330, which may be optional in some embodiments, at total number of the gaming machines which include a respective asset is determined, wherein a respective license for the respective asset is included in the portfolio of assets.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic gaming machine, comprising:
a core processor electrically powered by a power supply when the electronic gaming machine is in a powered on state and electrically unpowered when the electronic gaming machine is in a powered off state, the core processor executes an operating system while in the powered on state;
a first writeable memory in communication with the core processor and having instructions stored therein that cause the core processor to execute a game title on the operating system of the electronic gaming machine;
a remote management controller electrically powered by the power supply when the electronic gaming machine is in the powered off state or the powered on state, wherein the remote management controller provides a gaming machine management server remote access via an input/output (I/O) controller to the first writeable memory, a storage device, and a non-volatile second writeable memory in the electronic gaming machine using an in-band channel and an out-of-band channel when the electronic gaming machine is in the powered on state, and provides the gaming machine management server remote access via the I/O controller to read and write data to the storage device or the non-volatile memory in the electronic gaming machine using only the out-of-band channel when the electronic gaming machine is in the powered off state or when the core processor of the electronic gaming machine is unable to execute the operating system; and
an unalterable memory storing a boot up procedure that is executable by the electronic gaming machine.

2. The electronic gaming machine of claim 1:
wherein the non-volatile second writeable memory stores data indicative of a number of event logs; and
wherein the remote management controller provides, via the I/O controller, the data indicative of the number of event logs over the out-of-band channel to the gaming machine management server.

3. The electronic gaming machine of claim 1:
wherein the non-volatile second writeable memory stores data indicative of authentication information; and
wherein the remote management controller provides, via the I/O controller, the data indicative of the authentication information over the out-of-band channel to the gaming machine management server.

4. The electronic gaming machine of claim 1:
wherein the non-volatile second writeable memory stores data indicative of an indicator of at least one software title stored in the first writeable memory; and
wherein the remote management controller provides, via the I/O controller, the data indicative of the indicator of the at least one software title over the out-of-band channel to the gaming machine management server.

5. A method of managing a plurality of remote gaming machines, comprising:
configuring, by a respective remote management controller in each of the plurality of remote gaming machines, read and write access to a non-volatile writeable memory, a storage device, and a non-volatile second writeable memory in the respective remote gaming machine using both an in-band channel and an out-of-band channel when power is provided by a power supply to the core processor in the respective remote gaming machine;
configuring, by the respective remote management controller in each of the plurality of remote gaming machines, read and write access to the storage device and the non-volatile second writeable memory in the respective remote gaming machine using only an out-of-band channel when power provided by the power supply is interrupted to the core processor in the respective gaming machine or the core processor in the respective gaming machine does not execute any operating system;
configuring each respective remote gaming machine of the plurality of gaming machines to have a respective unalterable boot up; and
communicating to a remote gaming management server via the respective remote management controller in each of the plurality of gaming machines at least one of: asset management data, authentication data and diagnostic data using the out-of-band channel regardless of whether the core processor in each of the respective gaming machines is powered or executes an operating system;
providing, via the respective remote management controller in the remote gaming machine, read and write access to the non-volatile second writeable memory of the respective remote gaming machine using the out-of-band channel at least while power to the core processor in the respective remote gaming machine is interrupted or the core processor in the respective gaming machine does not execute any operating system.

6. The method of claim 5 wherein providing, via the respective remote management controller in a remote gaming machine, read and write access to the respective non-volatile second writeable memory of the respective remote gaming machine further includes:

reading data indicative of an asset indicator of at least one respective asset that is stored in the non-volatile second writeable memory of the respective remote gaming machine.

7. The method of claim 6, further comprising:

managing a portfolio of assets based at least on asset indicators read from each of the plurality of remote gaming machines.

8. The method of claim 7 wherein managing a portfolio of assets further includes:

determining a total number of the plurality of remote gaming machines which include a respective asset, wherein a respective license for the respective asset is included in the portfolio of assets.

9. The method of claim 5 wherein providing, via the respective remote management controller in a remote gaming machine, read and write access to the respective non-volatile second writeable memory of the remote gaming machine further includes:

reading data indicative of a software title indicator of at least one respective software title stored in the respective non-volatile second writeable memory of the respective remote gaming machine.

10. The method of claim 9, further comprising:

managing a portfolio of licenses for software titles based at least on software title indicators read from each of the plurality of remote gaming machines.

11. The method of claim 10 wherein managing a portfolio of licenses for software titles further includes:

determining a total number of the plurality of remote gaming machines which store a respective software title, wherein a respective license for the respective software title is included in the portfolio of software titles.

12. The method of claim 5 wherein providing, via the respective remote management controller in a remote gaming machine, read and write access to the respective non-volatile second writeable memory of the remote gaming machine further includes:

reading data indicative of an event log for the respective gaming machine that is stored in the non-volatile second writeable memory while the core processor of the respective gaming machine receives power provided by the power supply and concurrently while the core processor of the respective remote gaming machine is not executing any operating system.

13. The method of claim 12, further comprising:

loading, from the remote gaming management server via the remote management controller in the respective remote gaming machine, a repair image to the non-volatile writeable memory to the respective remote gaming machine; and initiating a reboot of the core processor in the respective gaming machine.

14. The method of claim 5 wherein providing, via the respective remote management controller in a remote gaming machine, read and write access to the respective non-volatile second writeable memory of the remote gaming machine further includes:

reading data indicative of diagnostic indicator stored in the non-volatile second writeable memory of the respective remote gaming machine while power to the core processor of the respective remote gaming machine is interrupted.

15. The method of claim 5 wherein providing, via the respective remote management controller in a remote gaming machine, read and write access to the respective non-volatile second writeable memory of the remote gaming machine further includes:

reading data indicative of an authentication indicator for the respective remote gaming machine while power to the core processor of the remote gaming machine is interrupted.

16. The method of claim 15, further comprising:

verifying the authentication indicator for the respective gaming machine.

* * * * *